United States Patent
Dupaquis et al.

(10) Patent No.: US 10,496,301 B2
(45) Date of Patent: Dec. 3, 2019

(54) SHARING A MEMORY BETWEEN AT LEAST TWO FUNCTIONAL ENTITIES

(71) Applicant: INSIDE SECURE, Meyreuil (FR)

(72) Inventors: Vincent Dupaquis, Biver (FR); Stéphane Godzinski, Peynier (FR)

(73) Assignee: INSIDE SECURE, Meyreuil (FR)

( * ) Notice: Subject to any disclaimer, the term of this patent is extended or adjusted under 35 U.S.C. 154(b) by 0 days.

(21) Appl. No.: 15/784,007

(22) Filed: Oct. 13, 2017

(65) Prior Publication Data
US 2018/0039438 A1  Feb. 8, 2018

Related U.S. Application Data (63) Continuation of application No. PCT/FR2016/050801, filed on Apr. 7, 2016.

(30) Foreign Application Priority Data

Apr. 16, 2015 (FR) ...................... 15 53369

(51) Int. Cl.
*G06F 3/06* (2006.01)
*G06F 12/14* (2006.01)
(Continued)

(52) U.S. Cl.
CPC .......... *G06F 3/0622* (2013.01); *G06F 3/0637* (2013.01); *G06F 3/0644* (2013.01); *G06F 3/0659* (2013.01); *G06F 3/0673* (2013.01); *G06F 12/145* (2013.01); *G06F 12/1441* (2013.01); *G06F 12/1491* (2013.01);
(Continued)

(58) Field of Classification Search
CPC .. G06F 12/14; G06F 12/1441; G06F 12/1433; G06F 12/145; G06F 3/062; G06F 3/0622; G06F 3/0623; G06F 21/64; G06F 21/70–72; G06F 21/79
See application file for complete search history.

(56) References Cited

U.S. PATENT DOCUMENTS

| 7,555,617 B2* | 6/2009 | Timmermans | G06F 12/1441 711/154 |
| 7,616,206 B1* | 11/2009 | Danilak | G06F 15/16 345/505 |

(Continued)

FOREIGN PATENT DOCUMENTS

FR   2989801 A1   10/2013

OTHER PUBLICATIONS

English Translation of the International Search Report from PCT Application PCT/FR2016/050801, dated Aug. 29, 2016, 2 pages.

*Primary Examiner* — Khoa D Doan
(74) *Attorney, Agent, or Firm* — Brake Hughes Bellermann LLP (57) ABSTRACT

In a general aspect, a method for sharing a memory between two functional entities can include assigning, to the first functional entity, a first data transformation function and a first inverse transformation function, and assigning, to the second functional entity a second data transformation function and a second inverse transformation function. The second inverse data transformation function can be incompatible with the first data transformation function and the first inverse data transformation function can be incompatible with the second data transformation function.

22 Claims, 3 Drawing Sheets

(51) Int. Cl.
  *G06F 21/64* (2013.01)
  *G06F 21/74* (2013.01)
  *G06F 21/79* (2013.01)

(52) U.S. Cl.
  CPC .............. *G06F 21/64* (2013.01); *G06F 21/74* (2013.01); *G06F 21/79* (2013.01)

(56) References Cited

U.S. PATENT DOCUMENTS

| | | | |
|---|---|---|---|
| 7,966,465 B2 * | 6/2011 | Rodgers | G06F 21/52 |
| | | | 711/105 |
| 9,922,200 B2 * | 3/2018 | Hunt | G06F 21/6218 |
| 2002/0178338 A1 * | 11/2002 | Shibuya | G06F 11/2056 |
| | | | 711/173 |
| 2004/0165413 A1 * | 8/2004 | Takagi | G06F 21/77 |
| | | | 365/148 |
| 2005/0198062 A1 * | 9/2005 | Shapiro | G06F 16/2282 |
| 2008/0263286 A1 * | 10/2008 | Jeong | G06F 15/167 |
| | | | 711/149 |
| 2012/0110303 A1 * | 5/2012 | Dhanwada | G06F 9/52 |
| | | | 712/29 |
| 2014/0298141 A1 * | 10/2014 | Grube | G06F 9/4401 |
| | | | 714/768 |
| 2015/0032976 A1 | 1/2015 | Chapier et al. | |
| 2016/0232088 A1 * | 8/2016 | Mohan | G06F 12/0246 |
| 2017/0178597 A1 * | 6/2017 | Hasselgren | G06T 11/40 |

\* cited by examiner

SHARING A MEMORY BETWEEN AT LEAST TWO FUNCTIONAL ENTITIES

CROSS REFERENCE TO RELATED APPLICATIONS

This application is a continuation of, and claims priority to PCT Application No. PCT/FR2016/050801, filed Apr. 7, 2016, which claims priority to French Application No. 1553369, filed Apr. 16, 2015, the disclosures of which are incorporated herein by reference in their entireties.

TECHNICAL FIELD

This disclosure relates to approaches for sharing a memory in a device comprising at least one memory and at least two functional entities arranged on the same support or in the same housing, a first functional entity being configured to write and read data in at least a first area of the memory and a second functional entity configured to write and read data in at least a second area of the memory.

BACKGROUND

The sharing of a memory in a device of the aforementioned type raises various problems when a certain degree of security is sought as regards to data stored in the memory. Since the device's components can be arranged on the same support, or at least in the same housing and are, therefore, physically accessible, such devices are subject to attacks by malicious actors who may try to take control of a functional entity for accessing the memory area allocated to another functional entity. In addition to the risk of taking control, another known type of attack is error injection, for example by means of a laser beam, enabling a malicious actor to read data in a specific memory area or to corrupt data.

In order to overcome this type of attack, so-called Memory Protection Units (MPUs) have been developed which carry out a certain number of checks and verify that a particular entity is authorized to write or read data in given areas of the memory. For example, processors, such as microprocessors, can be equipped with a programmable MPU in which areas of the memory space are declared, together with their properties (read-only or read/write access, privileges, type of memory area: shareable, buffer, cache, etc.) and the respective access rights associated with the declared memory areas.

However, MPUs do not for countering all known attacks and, in particular, error injection attacks on the address bus. It may, therefore, be desirable to provide a device with multiple functional entities offering a satisfactory degree of security without requiring a memory protection unit.

It may also be desirable to provide approaches for improving the security of the data in a shared memory, in replacement or in addition to the protections offered by an MPU.

SUMMARY

Embodiments described herein relate to methods for sharing a memory in a device, where the device includes at least one memory and at least two functional entities arranged on a same support or in a same housing. In a general aspect, a method can include: configuring a first functional entity so that it writes and reads data in at least a first area of the memory; configuring a second functional entity so that it writes and reads data in at least a second area of the memory, disjoint from the first memory area; assigning to the first functional entity a first data transformation function and a first inverse data transformation function configured to restore and/or verify the validity of data transformed by the first transformation function; assigning to the second functional entity a second data transformation function and a second inverse data transformation function configured to restore and/or verify the validity of data transformed by the second transformation function, wherein the second inverse transformation function is incompatible with the first transformation function and the first inverse transformation function is incompatible with the second transformation function. The method can further include: configuring the first functional entity so that it applies the first transformation function to a data word before writing it into the first memory area, and applying the first inverse transformation function to a data word read from the first memory area; and configuring the second functional entity so that it applies the second transformation function to a data word before writing it into the second memory area, and applying the second inverse transformation function to a data word read from the second memory area by the second functional entity.

According to an embodiment, the method can include configuring at least the second inverse transformation function to provide an error status when it is applied to data transformed by means of the first transformation function.

According to an embodiment, the method can include performing a protection action against an attempt to read data in the first memory area by the second functional entity when the second inverse transformation function provides the error status after reading a data word in the memory.

According to an embodiment, the method can include configuring the first functional entity so that it also writes data to a third memory area, configuring the second functional entity so that it also reads data in the third memory area, assigning the second transformation function to the first functional unit, in addition to the first transformation function, without assigning the second inverse transformation function thereto, and configuring the first functional entity to apply the second transformation function to data written in the third memory area and intended for the second functional entity.

According to an embodiment, the method can include configuring the first functional entity so that it also reads data in the third memory area, configuring the second functional entity so that it also writes data to the third memory area, assigning the first transformation function to the second functional element, in addition to the second transformation function, without assigning the first inverse transformation function thereto, and configuring the second functional entity so that it applies the first transformation function to data intended for the first functional entity written in the third memory area.

According to an embodiment, the method can include configuring the first and second functional entities so that they write and read data in a third memory area, assigning to first functional entity, in addition to the first transformation function and the first inverse transformation function, the second transformation function and the second inverse transformation function, not assigning to the second functional entity the first transformation function or the first inverse transformation function, configuring the first functional entity to apply the second transformation function to data written in the third memory area and intended for the second functional entity.

According to an embodiment, the method can include configuring the first functional entity so that the first transformation function comprises adding a parity bit to a data word to be written, and the first inverse transformation function verifies that a data word read from the memory has a valid parity bit, and configuring the second functional entity so that the second transformation function comprises adding an inverse parity bit to a data word to be written, and the second inverse transformation function verifies that a data word read from the memory has a valid inverse parity bit.

According to an embodiment, the method can include configuring at least one functional entity so that its transformation function includes a data encoding function.

According to an embodiment, the method can include providing an encoding function using the address used for writing the data into the memory as a data encoding variable.

According to an embodiment, the method can include configuring at least one functional entity so that its transformation function includes a data signature function and its inverse transformation function includes a signature verification function providing an error status upon reading data that has not been transformed by means of the signature function.

According to an embodiment, at least one of the functional entities can be selected from a group including direct memory access controllers, signal processors, or software functions executed by one or more processors.

Embodiments described herein also relate to devices that include at least one memory and at least two functional entities arranged on a same support or in a same housing. In another general aspect, a first functional entity of such a device can be configured to write or read data in at least a first area of the memory, a second functional entity of the device can be configured to write or read data in at least a second area of the memory, disjoint from the first memory area. The first functional entity can include, or implement, a first data transformation function and a first inverse data transformation function for restoring and/or verifying the validity of data transformed by the first transformation function. The second functional entity can include, or implement, a second data transformation function and a second inverse data transformation function for restoring and/or verifying the validity of data transformed by the second transformation function. The second inverse transformation function can be incompatible with the first transformation function and the first inverse transformation function can be incompatible with the second transformation function, the first functional entity can be configured to apply the first transformation function to a data word before writing it into the first memory area, and apply the first inverse transformation function to data read from the first memory area, and the second functional entity can be configured to apply the second transformation function to a data word before writing it into the second memory area, and apply the second inverse transformation function to a data read from the second memory area.

According to an embodiment, the second inverse transformation function can be configured to provide an error status during the inverse transformation of data transformed by the first transformation function.

According to an embodiment, the second functional entity can be configured to perform a protection action against an attempt to read data in the first memory area by the second functional entity when the second inverse transformation function provides the error status after reading data in the memory by the second functional entity.

According to an embodiment, the first functional entity can be configured to also write data into a third memory area, the second functional entity can be configured to also read data in the third memory area, the first functional entity includes, in addition to the first transformation function, the second transformation function, but does not include the second inverse transformation function, and the first functional entity can be configured to apply the second transformation function to the data written in the third memory area and intended for the second functional entity.

According to an embodiment, the first functional entity can be configured to also read data in the third memory area, the second functional entity can be configured to also write data into the third memory area, the second functional entity includes, in addition to the second transformation function, the first transformation function, but does not include the first inverse transformation function, and the second functional entity can be configured to apply the first transformation function to data intended for the first functional entity written in the third memory area.

According to an embodiment, the first and second functional entities can be configured to write and read data in a third memory area, the first functional entity includes, in addition to the first transformation function and the first inverse transformation function, the second transformation function and the second inverse transformation function, the second functional entity includes neither the first transformation function nor the first inverse transformation function, and the first functional entity is configured to apply the second transformation function to data written in the third memory area and intended for the second functional entity.

According to an embodiment, the first transformation function can include adding a parity bit to a data word to be written, and the first inverse transformation function includes verifying that a data word read from the memory has a valid parity bit, and the second transformation function can include adding an inverse parity bit to a data word to be written, and the second inverse transformation function includes verifying that a data word read from the memory has a valid inverse parity bit.

According to an embodiment, the transformation function of at least one functional entity can include a data encoding function.

According to an embodiment, the encoding function can use the address for writing the data into the memory as a variable for encoding the data.

According to an embodiment, the transformation function of at least one functional entity includes a data signature function and the inverse transformation function can include a signature verification function providing an error status when reading data that has not been transformed by the signature function.

According to an embodiment, at least one of the functional entities can be selected from the group comprising direct memory access controllers, signal processors, or software functions executed by one or more processors.

BRIEF DESCRIPTION OF DRAWINGS

Other advantages and features will become more clearly apparent from the following description of particular embodiments, which are provided for exemplary purposes only and represented in the appended drawings, in which.

DETAILED DESCRIPTION

Figure 1:
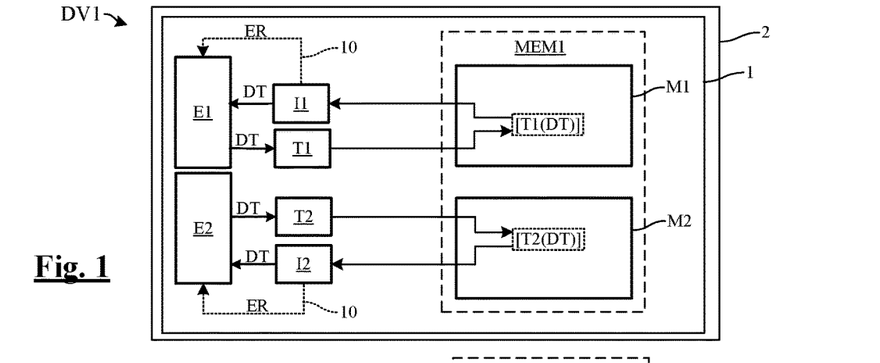
FIG. 1 is a block diagram of a first embodiment of a device.

FIG. 1 is a block diagram of a device DV1 comprising two functional entities E1, E2 and a memory MEM1, for example a random-access memory (RAM). The memory comprises two distinct and disjoint memory areas M1 and M2 respectively dedicated to the functional entities E1 and E2, each configured to write and read data DT in the memory area assigned to it.

The functional entities E1, E2 and the memory MEM1 are arranged on the same interconnection support 1, or on different interconnection supports arranged in a housing 2 of the device and interconnected. The interconnection support 1 may be a semiconductor chip if the functional entities and the memory are integrated on the same semiconductor chip or a printed circuit board if the functional entities and the memory are integrated on distinct semiconductor chips. The functional entities and/or the memory can also be arranged on different printed circuits boards. The functional entities E1, E2 may be two different processors, for example a main processor and a peripheral processor, two CPUs of a multi-core processor having several physical cores operating in parallel, programs (services, applications) executed by the same processor or different processors, different users of the same processor not having the same access rights to the memory, for example an administrator user and a non-administrator user, etc., or a combination of these various types of functional entities. Memory sharing allows each functional entity to have a dedicated space where it can store application data, variables, code, and so on.

In order to protect the data present in each memory area M1, M2 and/or to detect unauthorized reading in each memory area by an entity to which this memory area has not been allocated, each functional entity E1, E2 is provided with a data transformation function, respectively T1, T2, and an inverse transformation function, respectively I1, I2. In FIG. 1 and the following figures, the functions T1, I1, T2, I2 are represented outside the blocks designating the functional entities E1, E2, but can also be considered as an integral part of the functional entities E1, E2.

Each functional entity E1, E2 is configured to write data to the memory area reserved thereto via the transformation function T1, T2 assigned thereto and to read data in the memory area reserved thereto via the inverse transformation function I1, I2 assigned thereto.

Each transformation function T1, T2 is designed to provide transformed data T1(DT), T2(DT), respectively, from data DT to be written into the memory. Thus the functional entity E1 writes data T1(DT) in the memory area M1 and the functional entity E2 writes data T2(DT) in the memory area M2. The transformed data may be initial data DT transformed by encoding or initial signed data, or initial data transformed by encoding and then signed, or signed and then transformed by encoding.

Each inverse transformation function I1, I2 is designed to restore and/or verify the validity of the initial data DT from the transformed data T1(DT), T2(DT), hence, in the case of a restoration of the initial data:

I1(T1(DT))=DT

I2(T2(DT))=DT or, in the case of a verification of the validity of the data T1(DT), T2(DT):

I1(T1(DT))=OK (validity confirmed)

I2(T2(DT))=OK (validity confirmed)

or, in the case of a restoration and a verification of the validity of the data read from the memory:

I1(T1(DT))=DT and I1(T1(DT))=OK

I2(T2(DT))=DT and I2(T2(DT))=OK

Furthermore, the transformation and inverse transformation functions of the functional entities E1, E2 are designed to be incompatible from one entity to the other, the inverse transformation function I1 being incompatible with the transformation function T2 and the inverse transformation function I2 being incompatible with the transformation function T1. Thus, the inverse transformation function I1 does not allow to restore and/or verify the validity of data DT transformed by the transformation function T2 and the inverse transformation function I2 does not allow to restore and/or verify the validity of data transformed by the transformation function T1. Therefore:

in the case of a restoration of the initial data, the data produced by the inverse transformation function, denoted DT*, are erroneous and different from the initial data DT:

I1(T2(DT))=DT*

I2(T1(DT))=DT* in the case of a verification of the validity of the data supplied by a transformation function not corresponding to the used inverse transformation function, an error state "ER" is produced:

I1(T2(DT))=ER

I2(T1(DT))=ER in the case of a restoration of the initial data and a checking of the validity of the data produced by a transformation function not corresponding to the used inverse transformation function, erroneous data DT* are provided together with an error state:

I1(T2(DT))=DT* and I1(T2(DT))=ER

I2(T1(DT))=DT* and I2(T1(DT))=ER.

The functions T1, T2, I1, I2 can be implemented as hardware circuits arranged in the data path connecting the functional entities E1, E2 to the memory MEM1, for example hardwired logic circuits. In the case where the functions I1, I2 verify the validity of the data read from the memory areas (that is to say, ensure that the data has been transformed by the corresponding transformation function), each provides the error state in the form of an error signal ER, which is routed via a hardware link 10 to the associated entity, the function I1 supplying the error signal ER to the functional entity E1 and the function I2 supplying the error signal ER to the functional entity E2. The error signal is, for example, set to 1 if the data is invalid. The occurrence of the error signal causes a protective action against an attempt by the concerned entity to read data in a memory area that has not been allocated to it, for example a hardware or software block or a reset of the concerned entity, or the provision of arbitrary data in place of the erroneous data, since the latter, although erroneous, may contain usable information.

The functions T1, T2, I1, I2 may also be implemented in software, for example, in the form of subroutines called by the functional entities E1, E2 when writing and reading data in the memory MEM1. Known techniques for securing programs make it possible to prevent the functional entities E1, E2 from being diverted by a fraudster to write data to the memory without first transforming it using the functions T1, T2 or to read data without going through the inverse transformation functions I1, I2. For example, subroutines implementing the functions T1, T2, I1, I2 may provide signatures that allow write or read access to memory, so that they are executed when access to the memory is made or performed. The error state ER is in this case software and can be processed in a manner similar to the hardware error signal in order to execute a protection action against reading a memory area by a functional entity to which the memory area has not been allocated, for example a program blocking the entity that detects the existence of the read error. For example, the error may result in a direct call by the inverse transform routine to a subroutine designed to perform this action.

Figure 2:
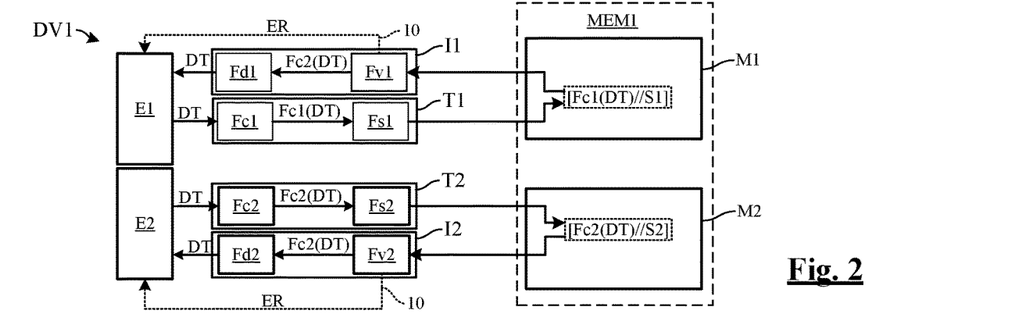
FIG. 2 shows an embodiment of data transformation functions that are shown in block form in FIG. 1, FIGS. 3A and 3B illustrate examples of attacks against the device of FIG. 1 which are countered by the approaches disclosed herein.

FIG. 2 shows an exemplary embodiment of the device DV1 in which each transformation function T1, T2 comprises an encoding function, respectively Fc1, Fc2, and a signature function, respectively Fs1, Fs2. Conversely, each inverse transformation function I1, I2 comprises a decoding function, respectively Fd1, Fd2, and a signature verification function, respectively Fv1, Fv2.

In FIG. 2, the signature function Fs1, Fs2 is located after the encoding function Fc1, Fc2, so that the transformation function T1 supplies signed and coded data Fc1(DT)//S1 (where // is a symbol denoting a concatenation and S1 is the signature provided by the function Fs1) which is stored in the memory area M1. Similarly, the transformation function T2 supplies signed and coded data Fc2(DT)//S2 (S2 being the signature supplied by the function Fs2) which is stored in the memory area M2.

The signature check function Fv1, Fv2 is thus performed before the decoding function Fc1, Fc2, so that the verification function Fv1 verifies the validity of the signature S1 of the encoded data Fc1(DT) before the decoding function Fd1 restores the data DT, Fd1 being such that:

Fd1(Fc1(DT))=DT

Similarly, the verification function Fv2 verifies the validity of the signature S2 of the encoded data Fc2(DT) before the decoding function Fd2 restores the data DT, Fd2 being such that:

Fd2(Fc2(DT))=DT

According to some embodiments, the signature function Fs1, Fs2 is performed before the encoding function Fc1, Fc2, so that the transformation function T1 supplies coded signed data Fc1(DT//S1) and the transformation function T2 supplies coded signed data Fc2(DT//S2). The data is then decoded before its signature is verified. The execution of the signature and encoding operations can also be reversed between the two transformation functions, one encoding the data before signing it and the other signing the data before encoding it.

The incompatibility of the function I1 with the function T2 and of the function I2 with the function T1 here results in an incompatibility between the signature verification function Fv1 and the signature function Fs2 and between the signature verification function Fv2 and the signature function Fs1, as well as between the decoding function Fd1 and the encoding function Fc2 and between the decoding function Fd2 and the encoding function Fc1. In other words:

the verification by the function Fv1 of a signature S2 generated by the signature function Fs2 causes transmission of the error state ER, the verification by the function Fv2 of a signature S1 generated by the signature function Fs1 causes transmission of the error state ER, the decoding by the function Fd1 of data Fc2(DT) encoded by the function Fc2 produces erroneous data DT*, and the decoding by the function Fd2 of data Fc1(DT) encoded by the function Fc1 produces erroneous data DT*.

In some embodiments, the transformation function T1 may include only the encoding function Fc1 or only the signature function Fs1. The transformation function T2 may include only the encoding function Fc2 or only the signature function Fs2. The inverse transformation function I1 may include only the decoding function Fd1 or only the signature verification function Fv1. The inverse transformation function I2 may include only the decoding function Fd2 or only the signature verification function Fv2.

In certain embodiments, the two functions Fc1, Fc2 use a same encoding algorithm implementing a code depending on an encoding key that is different for each of the functions. The key may include only one bit, or multiple bits. The encoding may be complex and use a standardized or "proprietary" cryptographic algorithm, or on the contrary be very simple and include, for example, scrambling the bits of the data according to a scrambling rule that is a function of the key.

In one embodiment, the encoding is as follows:

the function Fc1 does not invert the polarity of the bits of the data DT and adds to the data a most significant bit equal to 0, meaning that the polarity of the bits has not been inverted, and the function Fc2 inverts the polarity of the bits of the data DT (each bit equal to 1 becomes equal to 0 and each bit equal to 0 becomes equal to 1) and adds to the data a most significant bit equal to 1, meaning that the polarity of the bits has been inverted.

In this case, the decoding function Fd1 does not modify the data and can optionally verify that the most significant bit is equal to 1, and if not so, issue an encoding error state in addition to the signature error state provided by the signature verification function. The decoding function Fd2, on the other hand, includes a step of inverting the polarity of all the bits of the data DT, and optionally verifying that the most significant bit is equal to 0, and if not, transmitting an encoding error state.

According to certain embodiments:

the encoding function Fc1 generates a bit of random polarity 0 or 1, inverts the bits of the data if the bit of random polarity is equal to 1 and does not invert the bits of the data if the random polarity bit is equal to 0, and inserts the polarity bit as the most significant bit in the data, the encoding function Fc2 generates a bit of random polarity 0 or 1 and executes an encoding convention inverse to the preceding one, by inverting the bits of the data if the bit of random polarity is equal to 0 (instead of 1 for the function Fc1) and by not inverting the bits of the data if the bit of random polarity is equal to 1 (instead of 0 for the function Fc1), and inserts the polarity bit as the most significant bit in the data, the decoding function Fd1 evaluates the most significant bit, the polarity bit, inverts the bits of the data if the polarity bit is equal to 1, and does not invert the bits of the data if the polarity bit is equal to 0, and removes the polarity bit from the data, the decoding function Fd2 evaluates the most significant bit, the polarity bit, inverts the bits of the data if the polarity bit is equal to 0 and does not invert the value of the bits of the data if the polarity bit is equal to 1, and removes the polarity bit from the data.

In this example, a decoding error is not detected by the decoding function. The entity that reads the data written by the other entity simply receives data that is randomly erroneous.

In some embodiments, the encoding function Fc1, Fc2 uses, as input data, in addition to the data DT, the address AD where the data is to be written. In this case, the transformed data DT can be expressed:

Fc1(AD, DT), or

Fc2(AD, DT)

Such encoding enhances the resistance of the device against error injection attacks on an address bus. Indeed, in this case, the data is decoded using an address present in the read instruction, which is different from the address where the data was read due to the error injection. The decoded data is therefore invalid.

Some embodiments may also provide for the use of known signature functions Fs1, Fs2, such as standard Error Detection Codes (EDCs) or more complex Error Correction Codes (ECCs) such as Hamming codes.

For example, the function Fs1 may include the addition to the data of a signature S1 formed by a CRC code (Cyclic Redundancy Check) which is a function of the bits of the data, and the function Fs2 may include the addition to the data of a signature S2 formed by an inverse CRC code or a CRC code combined with a key. In this case, the signature verification function Fv1 recalculates the CRC code of the data and compares it to that which forms its signature S1, while the signature verification function Fv2 recalculates the CRC code of the data, inverts its bits or combines it with the key, then compares it to the one that forms the signature S2.

In an embodiment that is advantageous because of its simplicity, the function Fs1 comprises the addition to the data of a signature formed by a parity bit and the function Fs2 comprises the addition to the data of a signature S2 formed by an inverted parity bit.

In all these examples, the verification function Fv1 is incompatible with the signature function Fs2 and the verification function Fv2 is incompatible with the signature function Fs1, so that the verification by a functional entity E1, E2 of the signature of data signed by the other functional entity causes an error state.

Table 1 below provides an example of a transformation function T1 comprising an encoding function Fc1 without polarity changing and with the addition of a polarity bit equal to 0, combined with a signature function Fs1 comprising the addition of a parity bit, and the example of a transformation function T2 comprising an encoding function Fc2 changing the polarity of the bits of the data and adding of a polarity bit equal to 1, combined with a signature function Fs2 including adding an inverted parity bit.

TABLE 1

|  | Transformation T1 | | Transformation T2 | |
| --- | --- | --- | --- | --- |
|  | Encoding Fc1 | Signature Fs1 | Encoding Fc2 | Signature Fs2 |
| Initial data DT | Adding the polarity bit equal to 0 | Adding a parity bit to the encoded data | Polarity of the bits inverted and addition of the polarity bit equal to 1 | Adding an inverted parity bit to the encoded data |
| 1000 | 10000 | 100001 | 01111 | 011111 |

Table 2 below shows an embodiment in which the polarity bit is not added to the data.

TABLE 2

|  | Transformation T1 | | Transformation T2 | |
| --- | --- | --- | --- | --- |
|  | Encoding Fc1 | Signature Fs1 | Encoding Fc2 | Signature Fs2 |
| Initial data DT | No change in polarity | Adding a parity bit to the encoded data | Bit polarity inverted | Adding an inverse parity bit to the encoded data |
| 1000 | 1000 | 10001 | 0111 | 01110 |

In the above examples, the transformation functions T1 and T2 rely on the same encoding and/or signature algorithm and are differentiated by means of a parameter forming a key or the equivalent of a key, such as the polarity bit. In other embodiments, the transformation functions implement distinct encoding algorithms, one using for example a bit shuffling function and the other the polarity inversion function.

Figure 3A:
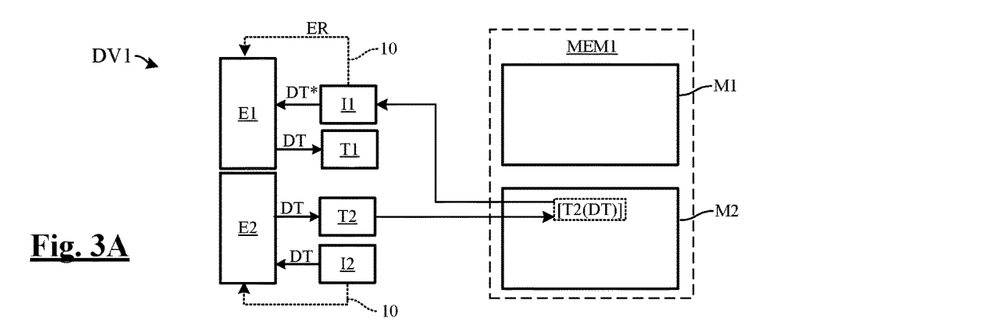
Figure 3B:
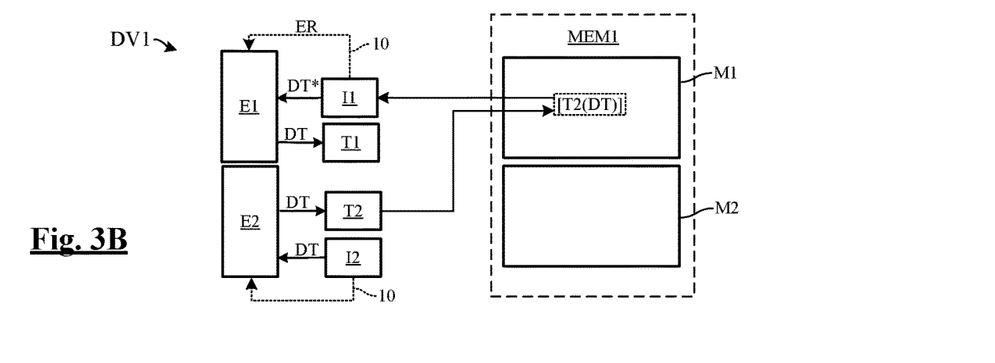

FIGS. 3A, 3B show examples of violations of the memory space MEM1, which the approaches described herein help to counter. In the example of FIG. 3A, the functional entity E2 legitimately writes in its memory area M2 data T2(DT) transformed by the function T2. This data is then illegitimately read by the functional entity E1. It is therefore subject to the inverse transformation function I1 that is incompatible with the transformation function T2. As a result, the error state ER is transmitted if the function I1 includes the signature verification function Fv1 with or without a decoding function Fd1. If the function I1 includes the decoding function Fd1 with or without the signature verification function Fv1, the read data DT* provided by the function Fd1 is erroneous (or randomly erroneous). The error state ER can also be transmitted by the decoding function Fd1 if it includes error detection (for example, when the key or a part of the key is included in the data and a verification of the relationship between the bits of the data and the bits of the key is possible). As indicated above, the error state can be used to block the functional entity E1 and thus stop the reading of the invalid data.

In the example of FIG. 3B, the functional entity E2 has illegitimately written, in the memory area M1 of the functional entity E1, data T2(DT) transformed by the function T2. This data is then legitimately read by the functional entity E1. It is therefore, as before, subjected to the inverse transformation function I1 that is incompatible with the transformation function T2. The consequences are similar to those described in relation to FIG. 3A.

Figure 4:
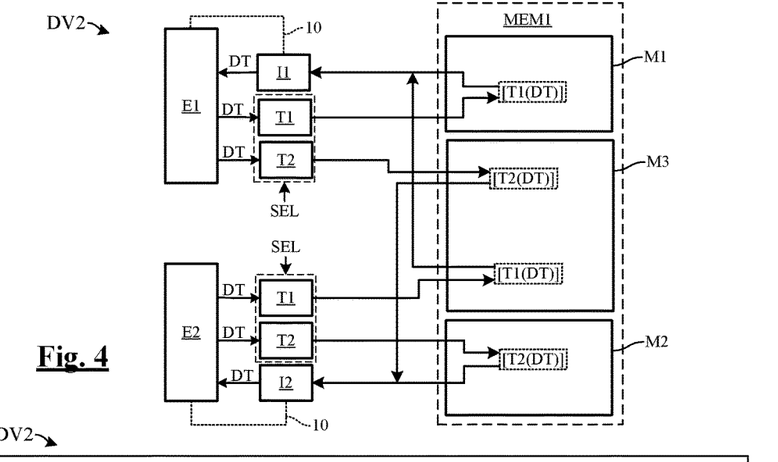
FIG. 4 is a block diagram of a second embodiment of a device.

FIG. 4 is a block diagram showing another embodiment DV2 of a device, in which a memory area M3 shared by the two functional entities E1, E2 is provided in the memory MEM1, in addition to the areas M1, M2. The aim here is to use the memory area M3 as a data exchange area from the functional entity E1 to the functional entity E2 and from the functional entity E2 to the functional entity E1.

For this purpose, the functional entity E1 is assigned the transformation function T2 of the functional entity E2 without the inverse transformation function I2, and the functional entity E2 is assigned the transformation function T1 of the functional entity E1 without the inverse transformation function I1. The functional entity E1 uses the transformation function T2 to write into the memory area M3 data intended for the functional entity E2 and continues to use the transformation function T1 to write data to the memory area M1. Once written in the memory area M3, the data T2(DT) can no longer be read by the functional entity E1 because it does not have the inverse transformation function I2, and can only be read by the functional entity E2. Conversely, the functional entity E2 uses the transformation function T1 to write into the memory area M3 data intended for the functional entity E1 and continues to use the transformation function T2 to write data to the memory area M2. Once written in the memory area M3, the data T1(DT) can no longer be read by the functional entity E2 because it does not have the inverse transformation function I1, and can only be read by the functional entity E1.

The selection by the functional entity E1 of the transformation function T1 or T2 and the selection by the functional entity E2 of the transformation function T2 or T1 is ensured by a selection signal SEL that is a function of the address of the data to write. This signal is, for example, equal to 1 if the address of the data is located in the memory area M3, otherwise it is 0. In this case, the functional entity E1 selects the function T2 if the signal SEL is equal to 1, otherwise the function T1 is selected by default. The functional entity E2 automatically selects the function T1 if the signal SEL is equal to 1, otherwise the function T2 is selected by default.

In some embodiments, the functional entity E2 does not have the transformation function T1 and is only authorized to read the memory area M3 or, conversely, the functional entity E1 does not have the transformation function T2 and is only authorized to read the memory area M3.

Figure 5:
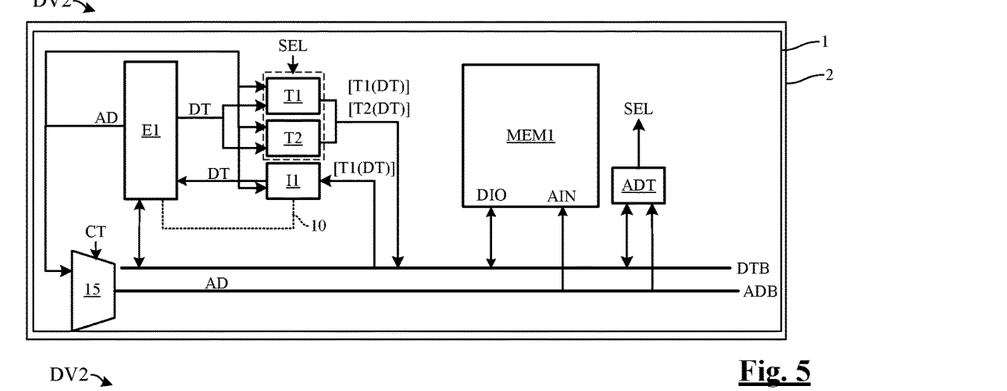
FIG. 5 shows an exemplary architecture of a functional entity of the device of FIG. 4.

FIG. 5 shows an exemplary architecture of the device DV2. As before, the functional entities E1, E2 and the memory MEM1 are arranged on the same interconnection support 1 or on different interconnection supports arranged in a housing 2 of the device. In FIG. 5, only the functional entity E1 is represented, the functional entity E2 being of the same architecture and having the same arrangement, replacing the reference "I1" with the reference "I2". The device DV2 comprises a data bus DTB, an address bus ADB, and an address multiplexer 15 controlled by a control signal CT, the output of which is connected to the address bus ADB. The control signal CT is supplied by a bus arbiter, not shown, which grants each of the entities periods of access to the memory MEM1 upon request from them, and manages the access priorities.

The memory MEM1 comprises a data input/output DIO connected to the data bus DTB and an address input AIN connected to the address bus ADB. The functional entity E1 comprises an address output connected to an input of the address multiplexer 15 whose other input receives an address output from the functional entity E2 (not shown). The transformation functions T1, T2 of the functional entity E1, selected by the SEL signal, each comprise an output connected to the data bus DTB, an input connected to a data output of the functional entity E1, supplying the data DT to be written to the memory MEM1. The inverse transformation function I1 comprises a data input connected to the data bus DTB for receiving transformed data T1(DT) and an output connected to a data input of the functional entity E1, in order to supply the functional entity E1 with data DT present in the transformed data T1(DT). Optionally, the functions T1, T2 and the function I1 also include an input connected to the address output of the functional entity E1, in order to use the data address AD as input data for the transformation of the data DT into data T1(DT) or T2(DT) and their decoding as a function of the address AD.

The device DV2 also comprises an address detector ADT having an address input connected to the address bus ADB and supplying the selection signal SEL to the functional entities E1 and E2. This address detector is for example a programmable circuit with secure access comprising address registers (not shown) configurable via the data bus DTB, as shown, or via secure private links. These registers make it possible to define the start and end addresses of the shared area M3.

Although the examples described herein are discussed with respect to a shared area M3, the address detector ADT may be more complex and allow programming of several address spaces. The detector could also provide a selection signal SEL1 dedicated to the functional entity E1 and a selection signal SEL2 dedicated to the functional entity E2. The address detector thus resembles a simplified type of memory protection unit devoid of the usual functions of monitoring the instructions and controlling the access rights of the functional entities E1, E2, the security of the memory MEM1 being here offered by the provision of the transformation and inverse transformation functions. In certain embodiments, memory sharing methods, such as those described here, can be combined with the use of a real memory protection unit (MPU), which can then be configured to provide the SEL signal and thus replace the address detector ADT.

Figure 6:
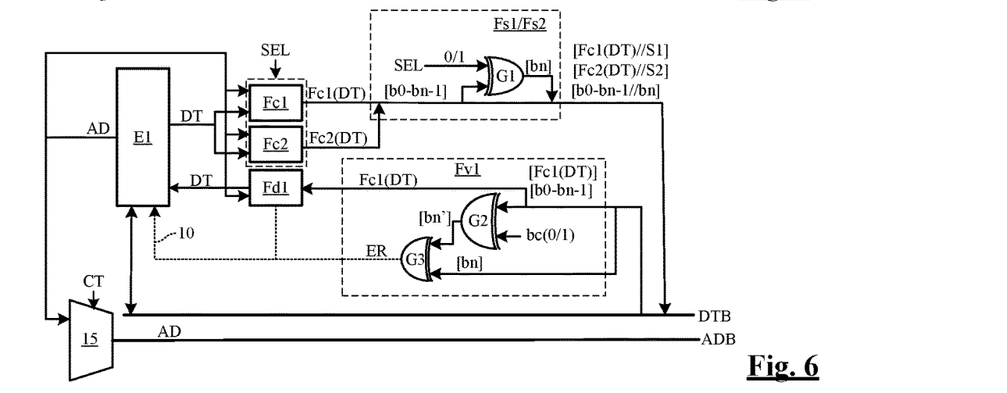
FIG. 6 shows an exemplary implementation of the functional entity of FIG. 5.

FIG. 6 shows an embodiment of the functional entity E1 of FIG. 5, in which the transformation function T1 comprises an encoding function Fc1 and a signature function Fs1, the transformation function T2 comprises an encoding function Fc2 and a signature function Fs2, and the inverse transformation function I1 comprises a decoding function Fd1 and a signature verification function Fv1.

The encoding functions Fc1, Fc2 and decoding function Fd1 are represented as blocks and may be implemented as described above in the form of a hardwired logic algorithm using a different key for each encoding function. The encoding functions Fc1, Fc2 each have an input connected to the data output of the functional entity E1 to receive the data DT and optionally an input to the address output of the functional entity E1 to receive addresses AD, and an output connected to the data bus DTB. The decoding function Fd1 has an input connected to the data bus DTB, and optionally an input connected to the address output of the functional entity E1, to receive addresses AD, and an output connected to the data input of the functional entity E1. The data input and output of the functional entity E1 represented as distinct in the figure may be formed by a same bidirectional port.

The signature functions Fs1, Fs2 are performed here by means of a logic gate G1 of EXCLUSIVE OR type ("XOR") having an input receiving the signal SEL and N inputs receiving bits b0-bn−1 of encoded data Fc1(DT), Fc2(DT) provided by the function Fc1, respectively Fc2. Depending on the value of the signal SEL, namely 0 or 1, the output of the gate G1 supplies a parity bit of the coded data Fc1(DT) or an inverse parity bit of the coded data Fc2(DT). The parity bit or the inverse parity bit is concatenated to the bits of the encoded data as the most significant bit "bn" to form signed coded data b0-bn−1//bn in which the bit bn forms the signature S1 or the signature S2, i.e. a data word Fc1(DT)//S1 or Fc2(DT)//S2. The concatenation may include adding a conductive track to the N tracks conveying the bits, the combination being directly connected to the data bus DTB, which then comprises N+1 bits, or connected to the data bus via a buffer circuit (not shown).

The signature verification function Fv1 is performed here by means of two gates G2, G3 of EXCLUSIVE OR type. The gate G2 has an input receiving a configuration bit bc with a fixed value 0 or 1 and N inputs receiving bits b0-bn−1 of a coded data word Fc1(DT) or Fc2(DT) supplied by the data bus DTB after reading the memory MEM1 (not shown, see FIG. 5). The bits b0-bn−1 are also applied to the data input of the decoding function Fd1. The configuration bit bc is here equal to 0 and the output of the gate G2 supplies a parity bit bn' as a function of the data bits b0-bn−1, which is applied to an input of the gate G3. The latter receives at another input the parity bit bn taken from the data bus DTB and supplies the error signal ER that is equal to 1 when the parity bits bn and bn' are different, which indicates that the data read from the memory has been corrupted during its storage or that the data has been written into the memory by the functional entity E2 and therefore has an inverse parity bit.

It will be noted that in this exemplary embodiment the structure of the functional entity E2 is similar to that of FIG. 6 by inverting the signal SEL at the input of the gate G1 so that the inverse parity bit is supplied when SEL=0, and by setting the configuration bit bc to 1, so that the gate G2 provides an inverse parity bit instead of the parity bit.

Figure 7:
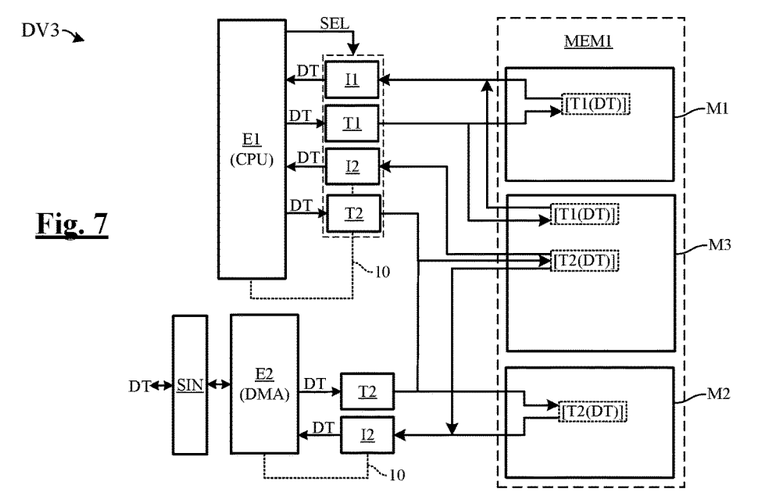
FIG. 7 is a block diagram of a third embodiment of a device.

FIG. 7 shows another embodiment DV3 of a device in which the functional entity E1 is a trusted entity, for example a central processing unit CPU of a secure processor, referred to as a "master" entity. The functional entity E2 is then a "slave" entity, for example a direct memory access processor (DMA). The DMA processor forming the functional entity E2 comprises a serial input SIN connected to various peripheral processors which can thus directly access the memory MEM1 without passing through the functional entity E1.

The memory comprises a memory area M3 which is, like before, readable and writable by the two functional entities E1, E2. As in the embodiment of FIG. 4, the aim here is to use the memory area M3 as a data exchange zone from the functional entity E1 to the functional entity E2 and from the functional entity E2 to the functional entity E1. However, unlike the embodiment of FIG. 4, the functional entity E1 is assigned the transformation function T2 of the functional entity E2 as well as its inverse transformation function I2, in addition to its own transformation function T1 and its inverse transformation function I1, while the functional entity E2 may have only its own transformation function T2 and inverse transformation function I2.

As shown in the figure, the functional entity E1 uses the transformation function T2 to write to the memory area M3 the data word T2(DT) intended for the functional entity E2, and can use the transformation function T1 to write to the memory area M1 or the memory area M3 the data word T1(DT), which is not intended for the functional entity E2 and cannot be read by it. Once written to the memory area M3, the data T2(DT) may also be read back by the functional entity E1 because the latter has here the inverse transformation function I2.

Furthermore, the functional entity E2 uses its transformation function T2 to write in the memory area M3 data T2(DT) intended for the functional entity E1, which the functional entity E1 can read using the inverse transformation function I2, or to write in the memory area M1 its own data T2(DT), but which the functional entity E1 could also read being here master of the memory.

The functional entity E1 uses, as above, a selection signal SEL, on the one hand, to select the transformation function T1 or the transformation function T2 when writing a data word in the memory area M1 or M3 (it could also write data in the memory area M2 of the functional entity E2) and, on the other hand, to select the inverse transformation function I1 or the inverse transformation function I2 when reading a data word in the memory area M1 or M3. This selection signal is not provided here by an address detector ADT as previously, but by the entity E1 itself as the trusted master of the memory.

Figure 8:
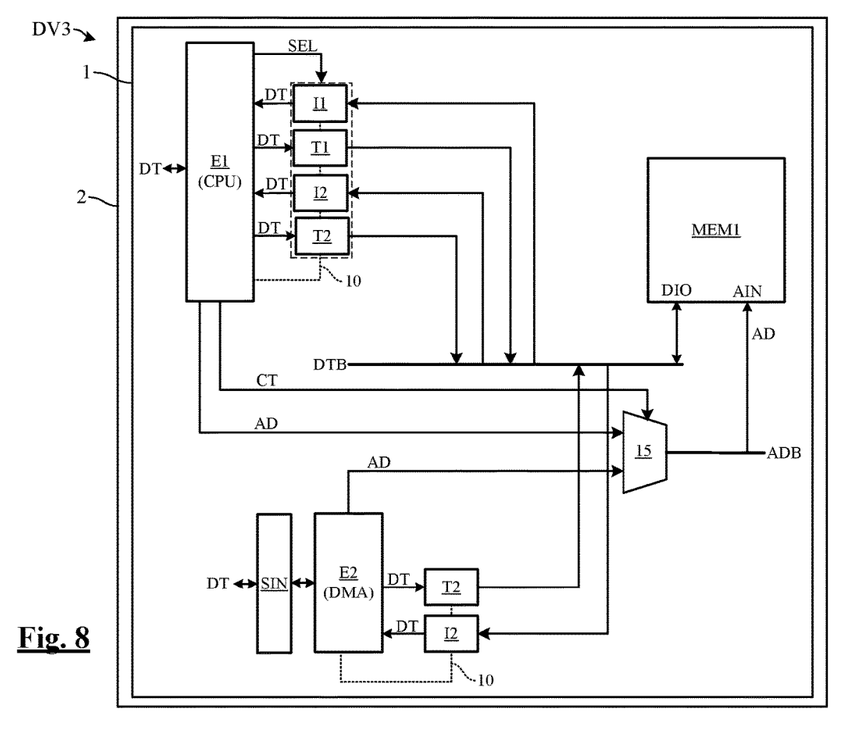
FIG. 8 shows an exemplary architecture of the device of FIG. 7.

FIG. 8 shows an example of an architecture of the device DV3. As before, the functional entities E1, E2 and the memory MEM1 are arranged on the same interconnection support 1 or on different interconnection supports arranged in a housing 2 of the device. The device DV3 comprises, as above, the data bus DTB and the address bus ADB, and the address multiplexer 15 controlled by the control signal CT. The control signal CT is here supplied by the functional entity E1, which is designated here as an arbiter of the address bus and grants periods of access to the memory MEM1 to the functional entity E2 and to the peripheral processors upon request of the functional entity E2 or peripheral processors.

As previously, the memory MEM1 comprises a data input/output DIO connected to the data bus DTB and an address input AIN connected to the address bus ADB. The functional entity E1 comprises an address output connected to an input of the address multiplexer 15 whose other input receives the address output of the functional entity E2. The transformation functions T1 and T2 of the functional entity E1 each have an output connected to the data bus DTB and an input connected to a data output of the functional entity E1. The inverse transformation functions I1, I2 of the functional entity E1 each include a data input connected to the data bus and an output connected to a data input of the functional entity E1. The transformation function T2 of the functional entity E2 comprises an output connected to the data bus DTB and an input connected to a data output of the functional entity E2. The inverse transformation function I2 of the functional entity E2 comprises a data input connected to the data bus and an output connected to a data input of the functional entity E2. Like the previous embodiments, this embodiment may also be implemented in software form, the inputs and outputs being themselves software.

It will be apparent that a device or method, such as those described herein, may be subject to various other embodiments. Although a two-entity device has been described in the foregoing, a memory sharing method, such as those described herein, can be applied to devices having a number of entities greater than 2 and several shared memories. The memory or memories may be volatile memories (RAM), programmable and electrically erasable memories (EE-PROM, Flash), or other types of memory. Similarly, although a division of the memory into only two or three zones has been described, a device may include, or implement, multiple private memory areas and multiple shared memory areas, and the same entity may be assigned several privative memory areas. A device may also have various applications. A device, for instance, may form all, or part, of a mobile telephone, a radio-television decoder, a smart card, etc.

The invention claimed is:

1. A method for sharing a memory in a device, the device including the memory and a plurality of functional entities arranged on a same support or in a same housing, the method comprising:

configuring a first functional entity of the plurality of functional entities such that the first functional entity writes data into, and reads data from a first area of the memory, configuring a second functional entity of the plurality of functional entities such that the second functional entity writes data into, and reads data from a second area of the memory, the second area of the memory being disjoint from the first area of the memory, assigning, to the first functional entity, a first data transformation function and a first inverse data transformation function, the first inverse data transformation function being configured to, at least one of, restore or verify validity of data transformed by the first data transformation function, assigning, to the second functional entity, a second data transformation function and a second inverse data transformation function, the second inverse data transformation function being configured to, at least one of, restore or verify validity of data transformed by the second data transformation function, wherein the second inverse data transformation function is incompatible with the first data transformation function, and the first inverse data transformation function is incompatible with the second data transformation function, configuring the first functional entity such that it applies the first data transformation function to data written, by the first functional entity, into the first area of the memory, and applies the first inverse data transformation function to data read, by the first functional entity, from the first area of the memory, and configuring the second functional entity such that it applies the second data transformation function to data written, by the second functional entity, into the second area of the memory, and applies the second inverse data transformation function to data read, by the second functional entity, from the second area of the memory.

2. The method of claim 1, further comprising configuring the second inverse data transformation function to provide an error status when it is applied to data transformed using the first data transformation function.

3. The method of claim 2, further comprising performing, in response to the error status, a protection action against an attempt to read data from the first area of the memory by the second functional entity, the second inverse data transformation function providing the error status.

4. The method of claim 1, further comprising:
configuring the first functional entity such that it writes data to a third area of the memory,
configuring the second functional entity such that it reads data from the third area of the memory,
assigning the second data transformation function to the first functional entity without assigning the second inverse data transformation function to the first functional entity, and
configuring the first functional entity to apply the second data transformation function to data written, by the first functional entity, into the third area of the memory that is to be read by the second functional entity.

5. The method of claim 4, further comprising:
configuring the first functional entity such that it reads data from the third area of the memory,
configuring the second functional entity such that it writes data to the third area of the memory,
assigning the first data transformation function to the second functional entity without assigning the first inverse data transformation function to the second functional entity, and
configuring the second functional entity such that it applies the first data transformation function to data written in the third area of the memory that is to be read by the first functional entity.

6. The method of claim 1, further comprising:
configuring the first functional entity and the second functional entity to write data to, and read data from a third area of the memory,
assigning, to the first functional entity, the second data transformation function and the second inverse data transformation function without assigning, to the second functional entity, the first data transformation function or the first inverse data transformation function, and
configuring the first functional entity such that it applies the second data transformation function to data written, by the first functional entity, into the third area of the memory that is to be read by the second functional entity.

7. The method of claim 1, further comprising:
configuring the first functional entity such that applying the first data transformation function includes adding a parity bit to data to be written into the memory, and applying the first inverse data transformation function includes verifying that data read from the memory has a valid parity bit, and
configuring the second functional entity such that applying the second data transformation function includes adding an inverse parity bit to data to be written into the memory, and applying the second inverse data transformation function includes verifying that data read from the memory has a valid inverse parity bit.

8. The method of claim 1, further comprising configuring the first functional entity such that the first data transformation function includes a data encoding function.

9. The method of claim 8, wherein the data encoding function uses an address used for writing data into the memory as a data encoding variable.

10. The method of claim 1, further comprising configuring the first functional entity such that the first data transformation function includes a data signature function and the first inverse data transformation function includes a signature verification function that provides an error status in response to the first functional entity reading data from the memory that has not been transformed using the data signature function.

11. The method of claim 1, wherein at least one of the first functional entity or the second functional entity is selected from a group including direct memory access controllers, signal processors, and software functions executed by one or more processors.

12. A device comprising:
a memory;
a first functional entity that is configured to write data into, and to read data from a first area of the memory, and
a second functional entity that is configured to write data into, and to read data from a second area of the memory, the second area of the memory being disjoint from the first area of the memory, the first functional entity and the second functional entity being arranged on a same support or in a same housing,
the first functional entity including a first data transformation function and a first inverse data transformation function, the first inverse data transformation function being configured to, at least one of, restore or verify validity of data transformed by the first data transformation function,
the second functional entity including a second data transformation function and a second inverse data transformation function, the second inverse data transformation function being configured to, at least one of, restore or verify validity of data transformed by the second data transformation function, the second inverse data transformation function being incompatible with the first data transformation function, and the first inverse data transformation function being incompatible with the second data transformation function, the first functional entity being further configured to apply the first data transformation function to data written, by the first functional entity, into the first area of the memory, and to apply the first inverse data transformation function to data read, by the first functional entity, from the first area of the memory, and the second functional entity being further configured to apply the second data transformation function to data written, by the second functional entity, into the second area of the memory, and to apply the second inverse data transformation function to data read, by the second functional entity, from the second area of the memory.

13. The device of claim 12, wherein the second inverse data transformation function is configured to provide an error status in response to applying the second inverse data transformation function to data transformed by the first data transformation function.

14. The device of claim 13, wherein the second functional entity is further configured to perform, in response to the second inverse data transformation function providing the error status, a protection action against an attempt to read data from the first area of the memory by the second functional entity.

15. The device of claim 12, wherein:
the first functional entity is further configured to write data into a third area of the memory,
the second functional entity is further configured to read data from the third area of the memory,
the first functional entity further includes the second data transformation function, but excludes the second inverse data transformation function, and
the first functional entity is further configured to apply the second data transformation function to data written, by the first functional entity, into the third area of the memory that is to be read by the second functional entity.

16. The device of claim 15, wherein:
the first functional entity is further configured to read data from the third area of the memory,
the second functional entity is further configured to write data into the third area of the memory,
the second functional entity further includes the first data transformation function, but excludes the first inverse data transformation function, and
the second functional entity is further configured to apply the first data transformation function to data written, by the second functional entity, into the third area of the memory that is to be read by the first functional entity.

17. The device of claim 12, wherein:
the first functional entity and the second functional entity are further configured to write data into, and read data from a third area of the memory,
the first functional entity further includes the second data transformation function and the second inverse data transformation function, and
the first functional entity is configured to apply the second data transformation function to data written, by the first functional entity, into the third area of the memory that is to be read by the second functional entity.

18. The device of claim 12, wherein:
applying the first data transformation function includes adding a parity bit to data to be written to the memory, and applying the first inverse data transformation function includes verifying that data read from the memory has a valid parity bit, and
applying the second data transformation function includes adding an inverse parity bit to data to be written to the memory, and applying the second inverse data transformation function includes verifying that data read from the memory has a valid inverse parity bit.

19. The device of claim 12, wherein the first data transformation function includes a data encoding function.

20. The device of claim 19, wherein the data encoding function uses an address for writing data into the memory as a data encoding variable.

21. The device of claim 12, wherein the first data transformation function includes a data signature function and the first inverse data transformation function includes a signature verification function that provides an error status in response to the first functional entity reading data from the memory that has not been transformed by the data signature function.

22. The device of claim 12, wherein at least one of the first functional entity or the second functional entity is selected from a group including direct memory access controllers, signal processors, and software functions executed by one or more processors.

* * * * *